United States Patent
Saito et al.

(10) Patent No.: US 8,204,355 B2
(45) Date of Patent: Jun. 19, 2012

(54) IMAGE SIGNAL PROCESSING DEVICE, IMAGING DEVICE, AND IMAGE SIGNAL PROCESSING METHOD

(75) Inventors: Masatake Saito, Kanagawa (JP); Nobuya Emoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1643 days.

(21) Appl. No.: 11/583,890

(22) Filed: Oct. 20, 2006

(65) Prior Publication Data

US 2007/0104462 A1    May 10, 2007

(30) Foreign Application Priority Data

Nov. 10, 2005  (JP) ................. P2005-326413

(51) Int. Cl.
H04N 5/77  (2006.01)

(52) U.S. Cl. ...................... 386/224; 386/226

(58) Field of Classification Search ......... 386/223–226; 348/143–169
See application file for complete search history.

(56) References Cited

U.S. PATENT DOCUMENTS

| 2004/0236807 A1* | 11/2004 | Hsiung et al. ............. 708/200 |
| 2005/0157949 A1* | 7/2005 | Aiso et al. ............. 382/299 |
| 2011/0099286 A1* | 4/2011 | Krikorian et al. ........ 709/231 |

FOREIGN PATENT DOCUMENTS

| JP | 2000-013741 A | 1/2000 |
| JP | 2002-320198 A | 10/2002 |
| JP | 2005-136596 A | 5/2005 |
| JP | 2005-160017 A | 6/2005 |

OTHER PUBLICATIONS

Japanese Office Action issued Oct. 5, 2010 for corresponding Japanese Application No. 2005-326413.

* cited by examiner

*Primary Examiner* — Thai Tran
*Assistant Examiner* — Nigar Chowdhury
(74) *Attorney, Agent, or Firm* — Rader Fishman & Grauer, PLLC

(57) ABSTRACT

An image signal processing device that includes: a recording section; a first processing section that calculates an amount of screen motion through detection of a motion of a captured image, and determines a frame rate through comparison between the amount of screen motion and a preset motion threshold value; and a second processing section that performs recording of the captured image to the recording section using the dynamically-variable frame rate notified by the first processing section.

23 Claims, 11 Drawing Sheets

IMAGE SIGNAL PROCESSING DEVICE, IMAGING DEVICE, AND IMAGE SIGNAL PROCESSING METHOD

CROSS REFERENCES TO RELATED APPLICATIONS

The present invention contains subject matter related to Japanese Patent Application JP 2005-326413 filed in the Japanese Patent Office on Nov. 10, 2005, the entire contents of which being incorporated herein by reference.

BACKGROUND OF THE INVENTION

1. Field of the Invention

The present invention relates to an image signal processing device that processes a succession of images, an imaging device, and an image signal processing method.

2. Description of the Related Art

As to a succession of images, the amount of processing data is generally proportional to a frame rate.

Recording a succession of high-frame-rate images with a previous method requires a large amount of recording data. There is thus a demand for a recording method enabling a further reduction of an amount of recording data.

The recording method for capturing a succession of images is mainly classified into two types as follows:
record images as still images, and
record images as moving images.

Considered first is a general recording method which records a succession of images as still images.

With such a method, the recorded still images are all completely separate, and they are not dependent on one another. Among the still images, there is usually no concept of the passage of time.

Accordingly, even with any images that are considerably similar to each other and showing little frame-to-frame motion, the images are separately recorded and stored each as a different still image. JPEG (Joint Photographic Experts Group) is exemplified for such a method.

Because the amount of recording data is proportional to a frame rate, this method causes increase of the amount of recording data if there is a high frame rate.

On the other hand, with a method of recording a succession of images as moving images, frames are continuously recorded at regular time intervals in accordance with a preset frame rate. During a sequence of moving images, no frame loss is allowed even if a single frame.

As such, the method requires frame recording with no frame loss irrespective of an increase or decrease of frame-to-frame motion.

That is, even with any images being considerably similar to each other and showing little frame-to-frame motion, for such a method using a fixed frame rate, there is no way of avoiding the increase of the amount of recording data if there is a high frame rate.

Motion JPEG or MPEG (Motion Picture Experts Group) Codec is exemplified for such a method.

If with Motion JPEG, because the frames are subjected only to intra-compression by JPEG, the amount of data is proportional to a frame rate, and the frame rate is fixed in value.

If with MPEG, e.g., MPEG2/4/H.264 AVC, the compression efficiency is increased due to compression using a frame-to-frame difference by inter-prediction, however, the frame rate is also fixed in value.

SUMMARY OF THE INVENTION

As such, to achieve a reduction of the amount of recording data using the previous technology, there are problems as described below.

With the method of recording images as still images, the frame-to-frame correlation is of no use.

With the method of recording images as moving images, the frame rate remains fixed in value irrespective of any change observed to the amount of motion between frames.

With any existing method of recording moving images, e.g., Motion JPEG, MPEG2/4/H.264 AVC, the frame rate is fixed in advance to a static value, e.g., 30 fps/60 fps.

As such, a general imaging device records 30 or 60 frames of moving images per second, and if with an object moving at high speed, the image recording cannot be made smooth.

The function of capturing still images in rapid succession is manually operated, and thus image recording cannot be made with reliability if an object is moving at high speed.

It is thus desirable to provide an image signal processing device, an imaging device, and an image signal processing method, all implementing an adoptive (dynamic) change of a frame rate in accordance with an amount of motion, and image recording in rapid succession, enabling smooth recording of moving images, and recording of still images following a fast-moving object.

According to one embodiment of the present invention, there is provided an image signal processing device that includes: a recording section; a first processing section that calculates an amount of screen motion through detection of a motion of a captured image, and determines a frame rate through a comparison between the amount of screen motion and a preset motion threshold value; and a second processing section that performs recording of the captured image to the recording section using the dynamically-variable frame rate notified by the first processing section.

According to another embodiment of the present invention, there is provided an imaging device that includes: an imaging section that captures an object image, and outputs image data; and an image signal processing device that applies a predetermined process to the image data. The image signal processing device includes: a recording section; a first processing section that calculates an amount of screen motion through detection of a motion of a captured image, and determines a frame rate through a comparison between the amount of screen motion and a preset motion threshold value; and a second processing section that performs recording of the captured image to the recording section using the dynamically-variable frame rate notified by the first processing section.

Preferably, the first processing section determines the frame rate based on an amount of temporal sum derived for the amount of screen motion.

Still preferably, the first processing section determines the frame rate for a current screen by referring to the frame rate for a preceding screen.

Still preferably, the first processing section sets a high value to the frame rate when the amount of screen motion is equal to or higher than the motion threshold value, and the second processing section performs recording of a corresponding frame to be recorded. The first processing section sets a low value to the frame rate when the amount of screen motion is smaller than the motion threshold value, and the second processing section performs recording by decimating a corresponding frame to be recorded.

Preferably, the motion threshold value is freely changed for setting.

According to a further embodiment of the present invention, there is provided an imaging device that includes: an imaging section that can capture an object image using an arbitrary frame rate, and outputs image data; and an image signal processing device that applies a predetermined process to the image data. The image signal processing device includes: a first processing section that calculates an amount of screen motion through detection of a motion of a captured image, and compares the amount of screen motion with a preset motion threshold value; and a control section that exercises control over the imaging section to autonomously start a high-frame-rate imaging operation when an amount of the sum derived for an amount of motion of the captured image reaches a fixed value.

Preferably, a determination reference value is calculated on a frame basis to determine whether a moving object entering an area available for imaging is worth imaging at least in terms of an amount of motion thereof.

Still preferably, during the high-frame-rate imaging operation, the amount of motion of the captured image is calculated and monitored, and when an attenuation of a fixed degree or more is observed with the amount of motion, the high-frame rate imaging operation is stopped.

According to a still further embodiment of the present invention, there is provided an image signal processing method that includes the steps of: detecting a motion of a captured image; calculating an amount of screen motion; determining a frame rate through a comparison between an amount of the temporal sum derived for the amount of screen motion and a preset motion threshold value; and performing recording of the captured image to the recording section using the dynamically-variable frame rate determined in the determining step.

According to a further embodiment of the present invention, there is provided an image signal processing method that includes the steps of: detecting a motion of a captured image; calculating an amount of screen motion; comparing an amount of temporal sum derived for the amount of screen motion with a preset motion threshold value; and exercising control over an imaging section to autonomously start a high-frame-rate imaging operation when an amount of the sum derived for an amount of motion of the captured image reaches a fixed value.

According to the embodiments of the invention, a frame rate can be changed adoptively (dynamically) in accordance with an amount of motion, and image recording in rapid succession, enabling smooth recording of moving images, and recording of still images following a fast-moving object can be implemented.

DETAILED DESCRIPTION OF THE INVENTION

Embodiments of the invention are described below in relation to the accompanying drawings.

Figure 1:
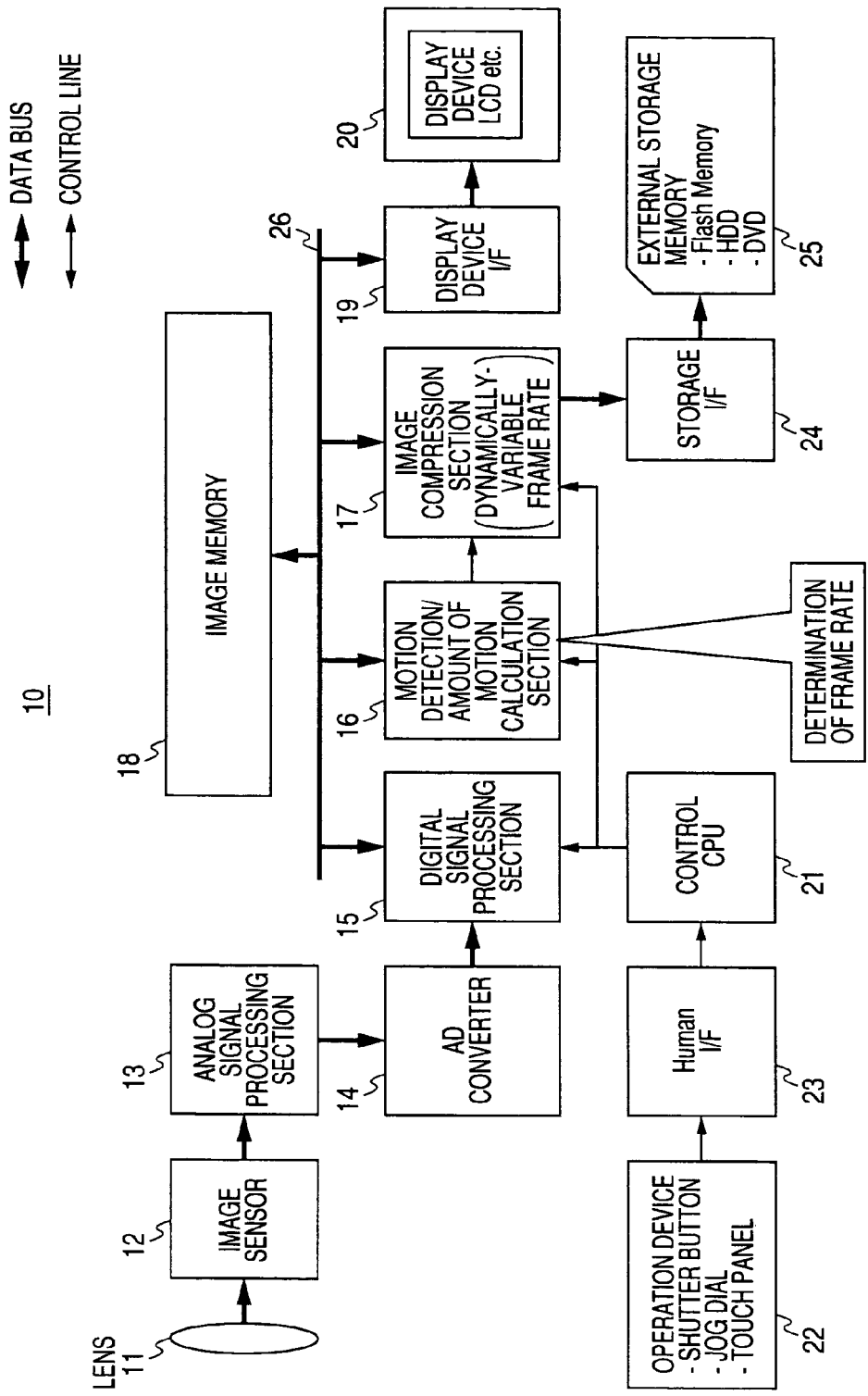
FIG. 1 is a block diagram showing an exemplary configuration of a camera system (imaging device) equipped with an image signal processing device of a first embodiment of the invention.

FIG. 1 is a block diagram showing an exemplary configuration of a camera system (imaging device) equipped with an image signal processing device of a first embodiment of the invention.

A camera system 10 is configured to include an optical system 11, an image sensor (imaging device) 12, an analog signal processing section 13, an analog/digital (A/D) converter 14, a digital signal processing section 15, a motion detection/amount of motion calculation section 16, an image compression/decompression section 17, an image memory 18, a display device interface (I/F) 19, a display device 20, a control CPU (Central Processing Unit) 21, an operation device 22, a human I/F 24, a storage I/F 24, and an external storage memory 25 serving as a recording section. The image sensor 12 is exemplified by a CCD (Charge-Coupled Device) or a CMOS (Complementary Metal Oxide Semiconductor) sensor. The motion detection/amount of motion calculation section 16 serves as a first processing section, and the image compression/decompression section 17 serves as a second processing section.

In the camera system 10, the components, i.e., the digital signal processing section 15, the image compression/decompression section 17, the motion detection/amount of motion calculation section 16, the image memory 18, and the display device I/F 19, are connected together via a bus 26.

The components, i.e., the optical system 11, the image sensor 12 exemplified by a CCD or a CMOS sensor, the analog signal processing section 13, and others, configure an imaging section.

The camera system 10 of this embodiment has the functions of calculating an amount of screen motion, and dynamically changing (setting) a frame rate depending on the calculated amount size.

The camera system 10 is configured including an algorithm of calculating the setting of a frame rate using the temporal sum derived for the amount of screen motion. The camera system 10 also has the function of determining a frame rate for a current screen by referring to a frame rate for the preceding screen.

The camera system 10 implements a dynamic frame rate variable recording.

Described first is the functional overview of, on a component basis, the camera system 10 shown in FIG. 1.

The optical system 11 is configured mainly by a lens, and it forms an image of an object (not shown) on the light-receiving surface of the image sensor 12 which is an imaging element.

The image sensor 12 applies optoelectronic conversion to information about the object image formed by the optical system 11. The result is forwarded to the analog signal processing section 13.

The analog signal processing section 13 applies correlated double sampling (CDS), analog amplification, or others to an analog output of the image sensor 12. The resulting analog image data is forwarded to the A/D converter 14.

The A/D converter 14 converts, to a digital signal, the analog image data provided by the analog signal processing section 13. The conversion result is forwarded to the digital signal processing section 15.

The digital signal processing section 15 is in charge of various types of processing, e.g., determining a shutter speed for use for imaging before imaging, adjusting brightness and color of the captured image, compressing the resulting image data by following a compression method that will be described later for recording into the image memory 18 serving as a recording medium, reading thus written image data from the image memory 18 for decompression (expansion), and the like.

The motion detection/amount of motion calculation section 16 reads the compressed data stored in the image memory 18, detects the motion of a captured image, and calculates the amount of screen motion. The sum amount of screen motion is then compared with a preset motion threshold value MTH to determine a frame rate, and information about the resulting frame rate is forwarded to the image compression section 17.

Figure 2:
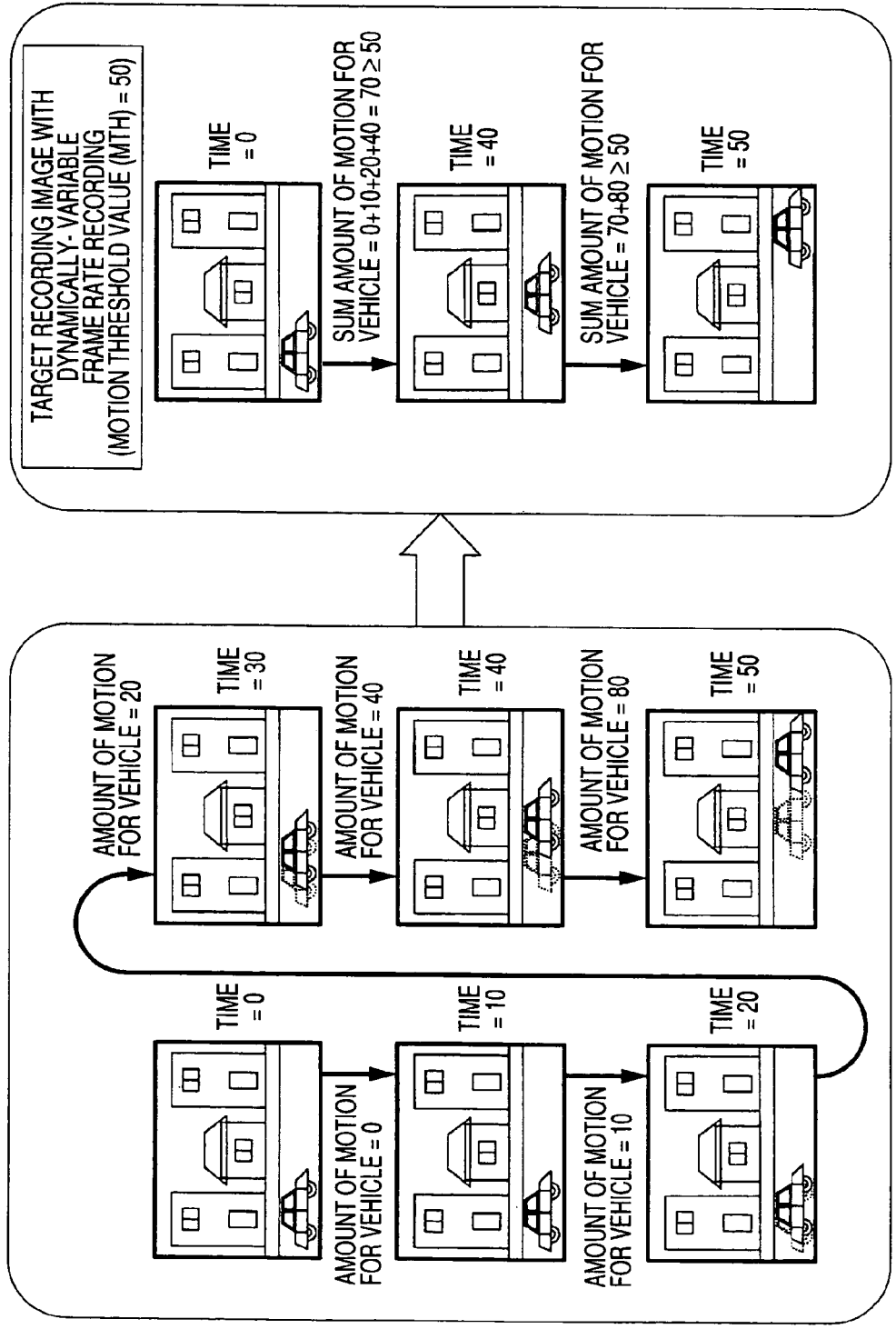
FIGS. 2A and 2B are both a diagram for illustrating, in the first embodiment, a detection example of an amount of screen motion, and dynamic variable frame rate recording.

The motion detection/amount of motion calculation section 16 calculates an amount of screen motion as shown in FIG. 2A.

FIG. 2A shows a scene diagram of a vehicle moving linearly with acceleration in the right direction of the drawing.

In such a case, with focus attention on the moving vehicle, the amount of how much the vehicle moves in a fixed length of time is defined as an amount of screen motion.

For example, the amount of screen motion is defined as "0" with the relative time T=0 when the vehicle is not yet moving, as "10" with the time T=10 after the vehicle starts moving, as "20" with the time T=20, as "40" with the time T=30, and as "80" with the time T=40.

As such, the motion detection/amount of motion calculation section 16 of this embodiment calculates a setting value for a frame rate using the temporal sum derived for the amount of screen motion.

The motion detection/amount of motion calculation section 16 has a function of reflecting the amount of the screen motion to the frame rate setting, e.g., function of determining a frame rate for a current screen by referring to a frame rate for a preceding screen.

The motion detection/amount of motion calculation section 16 compares the sum amount of screen motion with a preset motion threshold value MTH so that a frame rate is determined.

The motion threshold value MTH is set, for example, to a register of the CPU 21 by switch operation of the operation device 22, for example.

The motion threshold value MTH is set to a value of 50, 100, 200, 400, or others, and is then compared with the amount of the sum derived for the amount of screen motion as FIG. 2A so that a frame rate is determined.

The image compression/decompression section 17 functions, basically, as a decoder that reads any compressed data from the image memory 18 for decompression, and an encoder that creates an image source from a plurality of image data, e.g., camera signals, through a signal compression process.

The image compression/decompression section 17 functions as a so-called Codec engine, and performs so-called dynamic frame rate variable recording using the frame rate provided by the motion detection/amount of motion calculation section 16.

The image compression/decompression section 17 serving as a Codec engine stores image data to the image storage memory 25 via the storage I/F 24, or reproduces image data read from the memory 25.

As the image storage memory 25, a nonvolatile memory, e.g., a flash memory, a HDD (Hard Disk Drive), or a DV (Digital Video), is applicable.

Described next is the dynamic variable frame rate recording in the image compression/decompression section 17 serving as a Codec engine in relation to a specific example of FIGS. 2A and 2B.

In this example, the motion threshold value MTH is set to 50.

The sum amount of screen motion for the vehicle showing the motion threshold value MTH exceeding 50 will be 70 with the time T=40, and will be 80 with the time T=50. In this example, images with times T=0, 40, and 50 are target images for recording.

The display device I/F 19 forwards image data for display to the display device 20, and makes the display device 20 display thereon the image data.

As the display device 20, a liquid crystal display device (LCD) is applicable, for example.

The control CPU 21 takes charge of exercising control over the digital signal processing section 15, the image compression/decompression section 17, or the circuit in its entirety.

The control CPU 21 exercises control in accordance with the operation of the operation device 22 via the human I/F 22.

The operation device 22 is configured to include a shutter button, a jog dial, a touch panel, and others.

Figure 3:
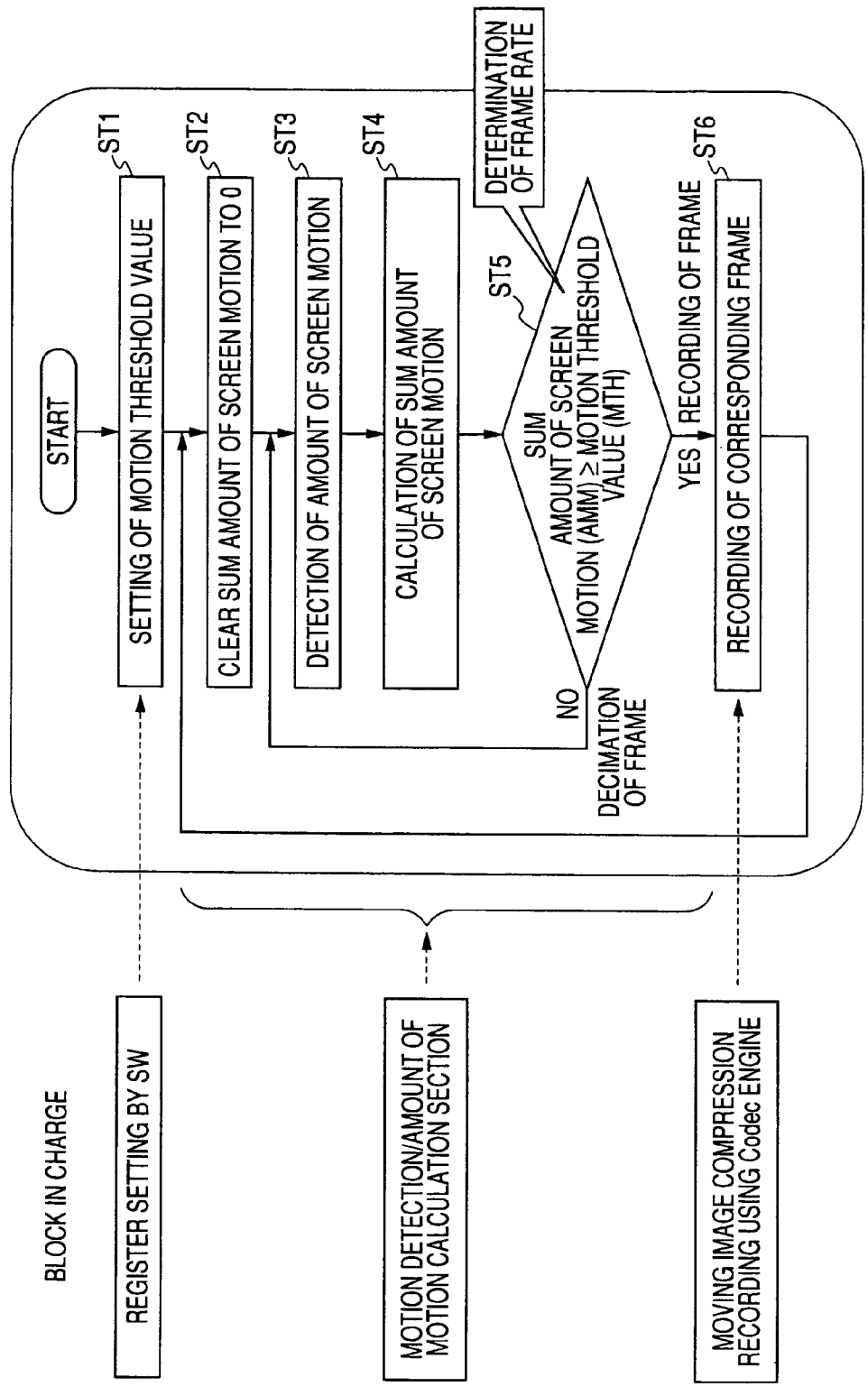
FIG. 3 is a flowchart for illustrating an operation, in the first embodiment, of a motion detection/amount of motion calculation section, and that of an image compression section serving as a codec engine.

Described next is the operation of the motion detection/amount of motion calculation section 16, and that of the image compression section 17 serving as a Codec engine in the above configuration in relation to the flowchart of FIG. 3.

In step ST1, a "motion threshold value MTH" is set in advance for use to determine whether to record or decimate the current frame.

In step ST2, the temporal data for use in determining a frame rate, i.e., "sum amount of screen motion" is firstly cleared to 0.

Then in step ST3, when a succession of high-frame-rate images is acquired by the image sensor 12, a motion vector and an amount of screen motion between temporally-adjacent (successive) frames are calculated.

Such calculation is required to be performed with a high frame rate.

Next, in step ST4, the calculated amount of screen motion is summed for the frames so that the "sum amount of screen motion" is calculated.

In step ST5, the resulting "sum amount of screen motion AMM" is then compared with the "motion threshold value MTH", and based on the comparison result, a determination is made whether to record or decimate the current frame.

At this time, when "sum amount of screen motion AMM"<"motion threshold value MTH" is established, a determination is made to reduce the frame rate by not recording the corresponding frame but decimating it.

When "sum amount of screen motion AMM">"motion threshold value MTH" is established, in step ST6, the determination is made to record the frame. After the frame is recorded, the procedure returns to the process of step ST2, i.e., the sum amount of screen motion is cleared to 0, and then the next frame is processed.

In this embodiment, the recording format is not specifically restricted.

Data compression is considered desirable using any appropriate image Codec or others.

Note that, because any exiting Codec is not yet ready for a dynamic frame rate variable, any dynamic frame rate variable portion may be required for format expansion or use of a new Codec, for example.

In this embodiment, the Codec mode for use for recording is not specifically restricted.

In step ST5, when "sum amount of screen motion AMM"<"motion threshold value MTH" is established, the procedure returns to the process of step ST3, and the amount of screen motion is detected.

Figure 4:
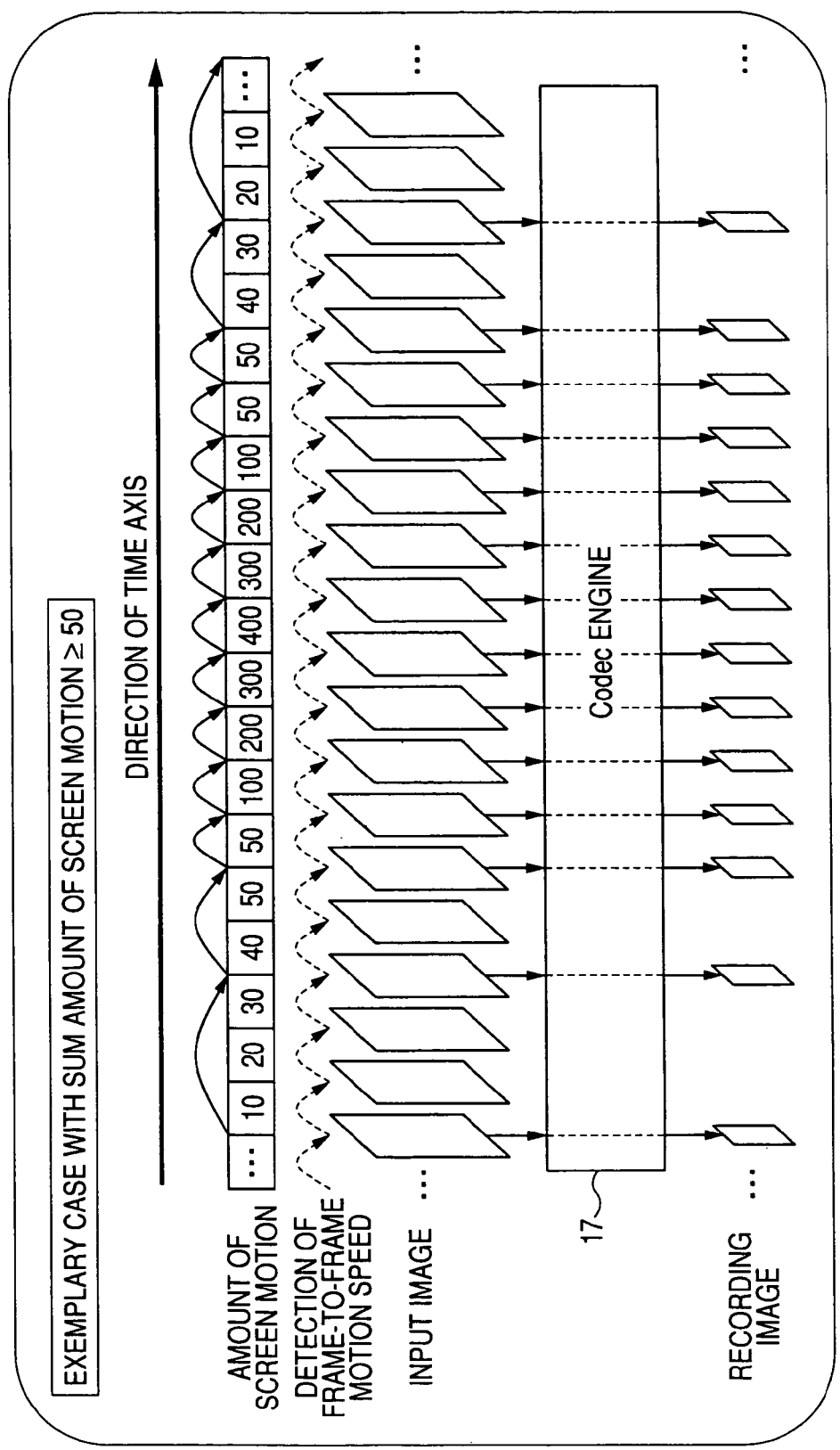
FIG. 4 is a schematic diagram showing, when a motion threshold value MTH is 50, an operation of dynamic variable frame rate recording with the device of motion speed adoptive type of the first embodiment.
Figure 5:
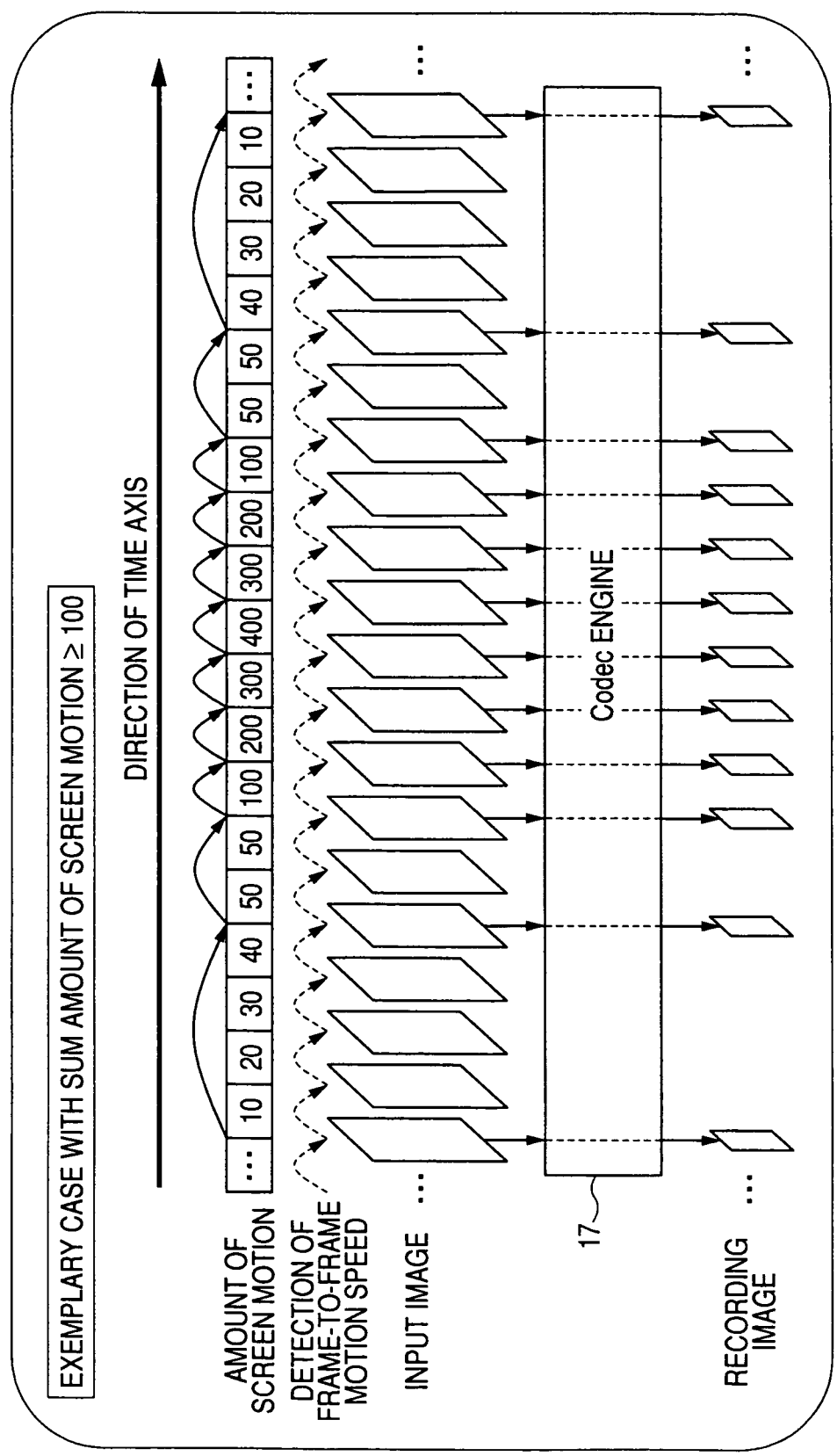
FIG. 5 is a schematic diagram showing, when the motion threshold value MTH is 100, an operation of dynamic variable frame rate recording with the device of motion speed adoptive type of the first embodiment.
Figure 6:
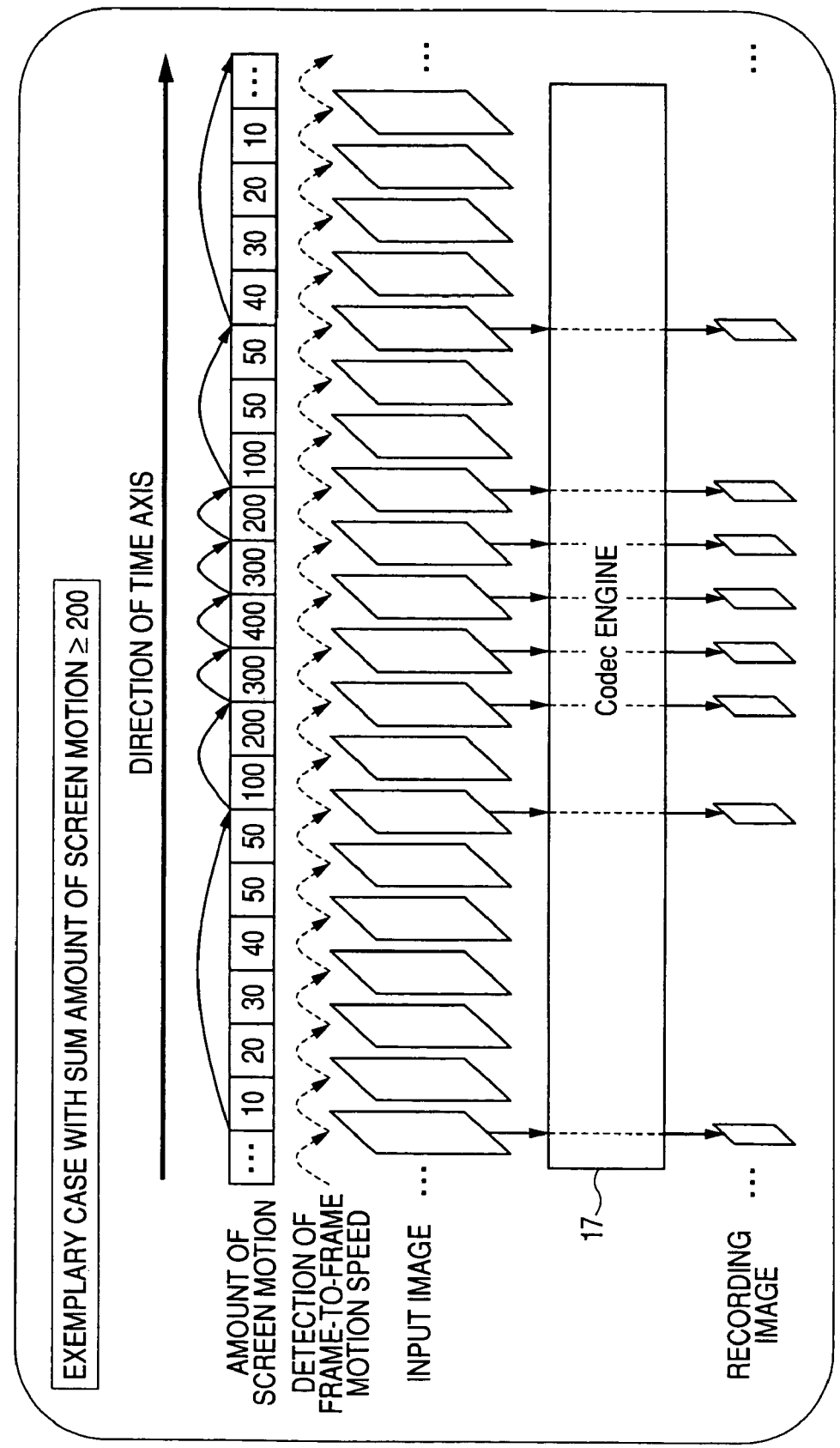
FIG. 6 is a schematic diagram showing, when the motion threshold value MTH is 200, an operation of dynamic variable frame rate recording with the device of motion speed adoptive type of the first embodiment.
Figure 7:
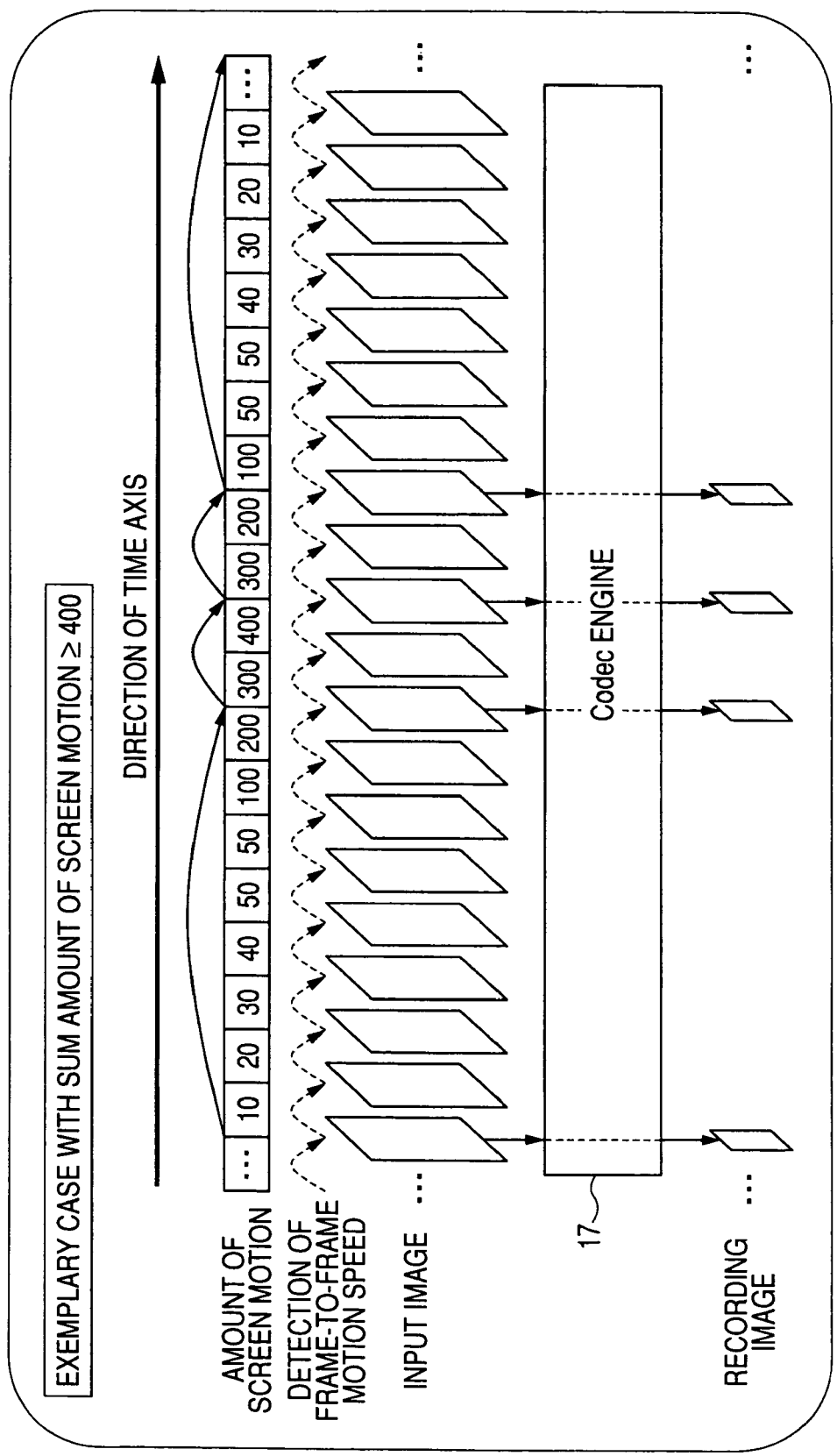
FIG. 7 is a schematic diagram showing, when the motion threshold value MTH is 400, an operation of dynamic variable frame rate recording with the device of motion speed adoptive type of the first embodiment.

FIGS. 4 to 7 are each a schematic diagram showing an operation of dynamic variable frame rate recording with the device of motion speed adoptive type of the first embodiment. Specifically, FIG. 4 shows a case when a motion threshold value MTH is 50, FIG. 5 shows a case when the motion threshold value MTH is 100, FIG. 6 shows a case when the motion threshold value MTH is 200, and FIG. 7 shows a case when the motion threshold value MTH is 400.

With the high frame rate, the amount of data is increased, and the consumption amount of a memory or the writing rate for media is increased. In a case of rapidly capturing a succession of still images showing less motion in scenes, for example, it means that many images showing little difference from one another are recorded.

In consideration thereof, as shown in FIGS. 4 to 7, the frame rate is made variable in accordance with the motion speed. More specifically, when the sum amount of screen motion is small in value, i.e., when the motion is slow, the corresponding image is decimated for recording with a low frame rate, and when the sum amount of screen motion is large, i.e., when the motion is fast, the image is recorded with a high frame rate.

As described above, according to the first embodiment, the configuration includes: the motion detection/amount of motion calculation section 16 that calculates an amount of screen motion through detection of a motion of a captured image, and determines a frame rate through comparison between the amount of screen motion and a preset motion threshold value; and the image compression/decompression section 17 that functions as a Codec engine, performing so-called dynamic frame rate variable recording using the frame rate notified by the motion detection/amount of motion calculation section 16. Such a configuration enables, in a moving image sequence, recording any moving-fast scene with a high time accuracy (high frame rate), and recording any moving-slow scene with a low time accuracy (low frame rate). Accordingly this dramatically reduces the amount of recording data of a succession of high-frame-rate images.

What is more, by (statically) changing the setting of a "motion threshold value", the sensitivity of the object against the motion speed can be changed, and the amount of recording data can be controlled in a succession of images.

Furthermore, dynamically changing the setting of the "motion threshold value" during recording enables intelligent and delicate control not only with the "sum amount of screen motion".

The intelligent and delicate control includes, for example, adjustment of motion sensitivity utilizing motion pattern recognition, frame rate adjustment based on dynamic factors, e.g., bus band or writing rate for media, and the like.

In the embodiment, recording is performed for every fixed amount of screen motion so that any similar scene is already skipped at the time of recording. As such, although the operation of selecting any desired scene from a long succession of high-frame-rate images requires considerable time and effort and thus is difficult, the present embodiment saves a lot of troubles that are caused thereby.

Figure 8:
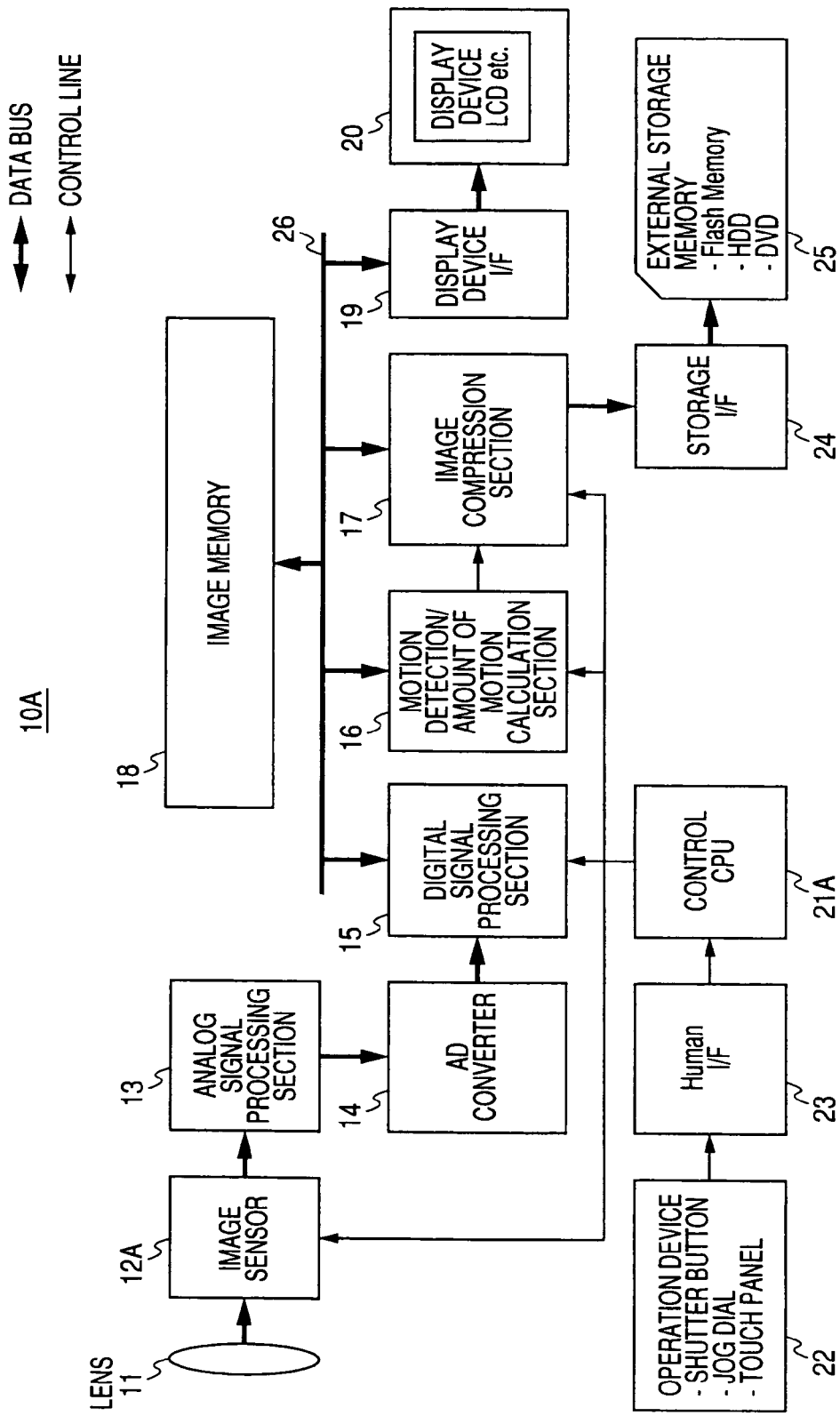
FIG. 8 is a block diagram showing an exemplary configuration of a camera system (imaging device) equipped with an image signal processing device of a second embodiment of the invention.

FIG. 8 is a block diagram showing an exemplary configuration of a camera system of a second embodiment of the invention.

A camera system 10A of the second embodiment is different from the camera system 10 of the first embodiment in the respect that an image sensor 12A is made controllable by a CPU 21A so that a frame rate is automatically increased.

More specifically, the camera system 10A is substantially similar in basic configuration to the system of FIG. 1, has the functions of capturing images with a high frame rate, calculating the amount of frame-to-frame motion, and summing and storing the amount of motion at each frame, and has a data area for temporary storage of a high-frame-rate imaging data of a fixed length of time. The high-frame-rate imaging operation is autonomously started when the sum amount of motion derived for any captured image reaches a fixed value, thereby implementing the function of capturing, with reliability, any object with a large amount of motion even if it abruptly appears in an area available for imaging.

The camera system 10A is provided with a function (algorithm) of calculating a determination reference value for every frame for use to determine whether a fast-moving object entering an area available for imaging is worth imaging at least in terms of an amount of motion or a size thereof, for example.

The camera system 10A also has a function of calculating and monitoring an amount of motion of the captured image during the high-frame-rate imaging operation, and when an attenuation of a fixed degree or more is observed with the amount of motion, stopping the high-frame rate imaging operation.

The motion detection/amount of motion calculation section 16 functions similarly to that of the first embodiment, i.e., calculates a setting value for a frame rate using the temporal sum derived for the amount of motion.

The motion detection/amount of motion calculation section 16 also has a function of reflecting the amount of the screen motion to the frame rate setting, e.g., function of determining a frame rate for a current screen by referring to a frame rate for a preceding screen.

The motion detection/amount of motion calculation section 16 compares the sum amount of screen motion with a preset motion threshold value MTH so that a frame rate is determined.

The CPU 21A then exercises control over the image sensor 12A.

Figure 10:
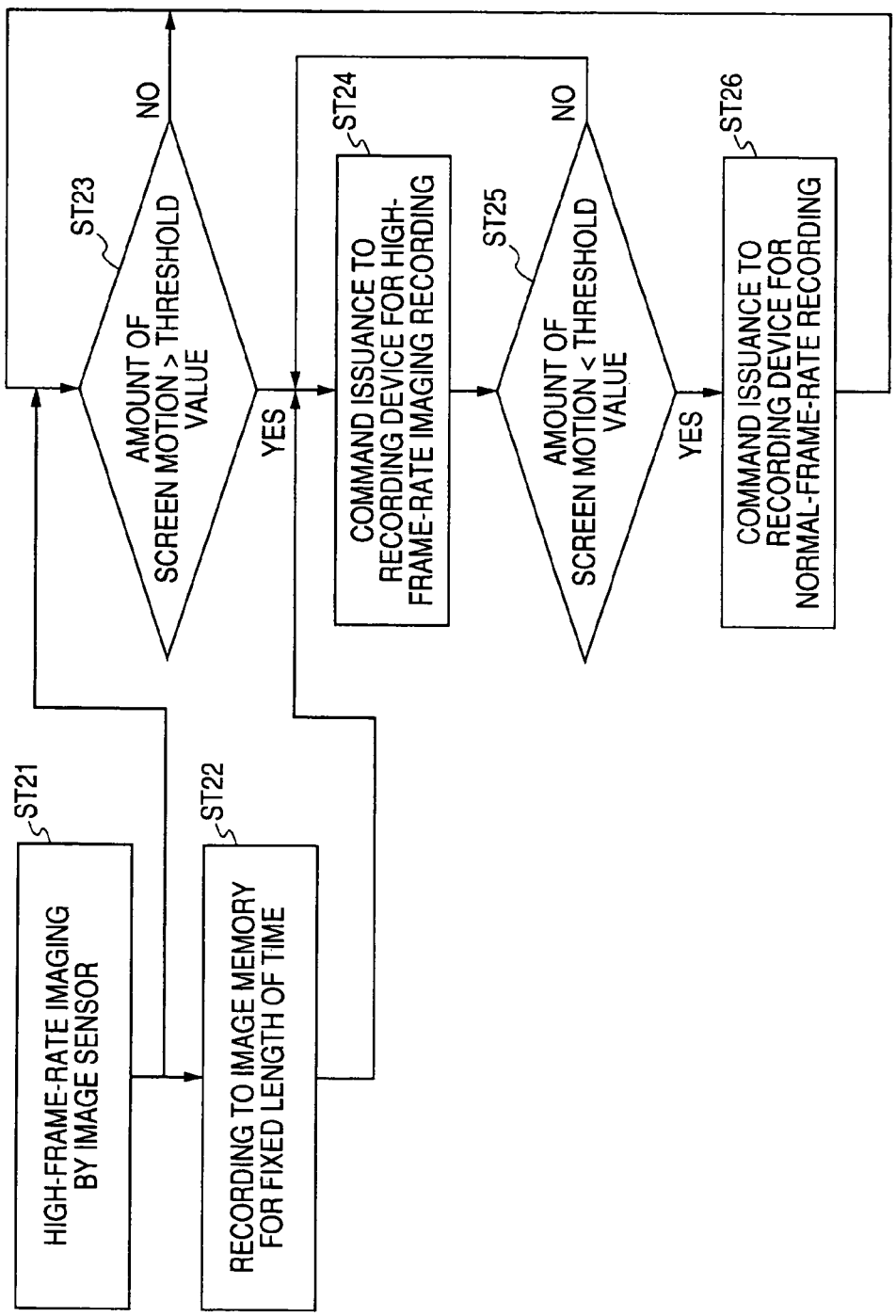
FIG. 10 is a flowchart for illustrating a second example of control application in the second embodiment.
Figure 11:
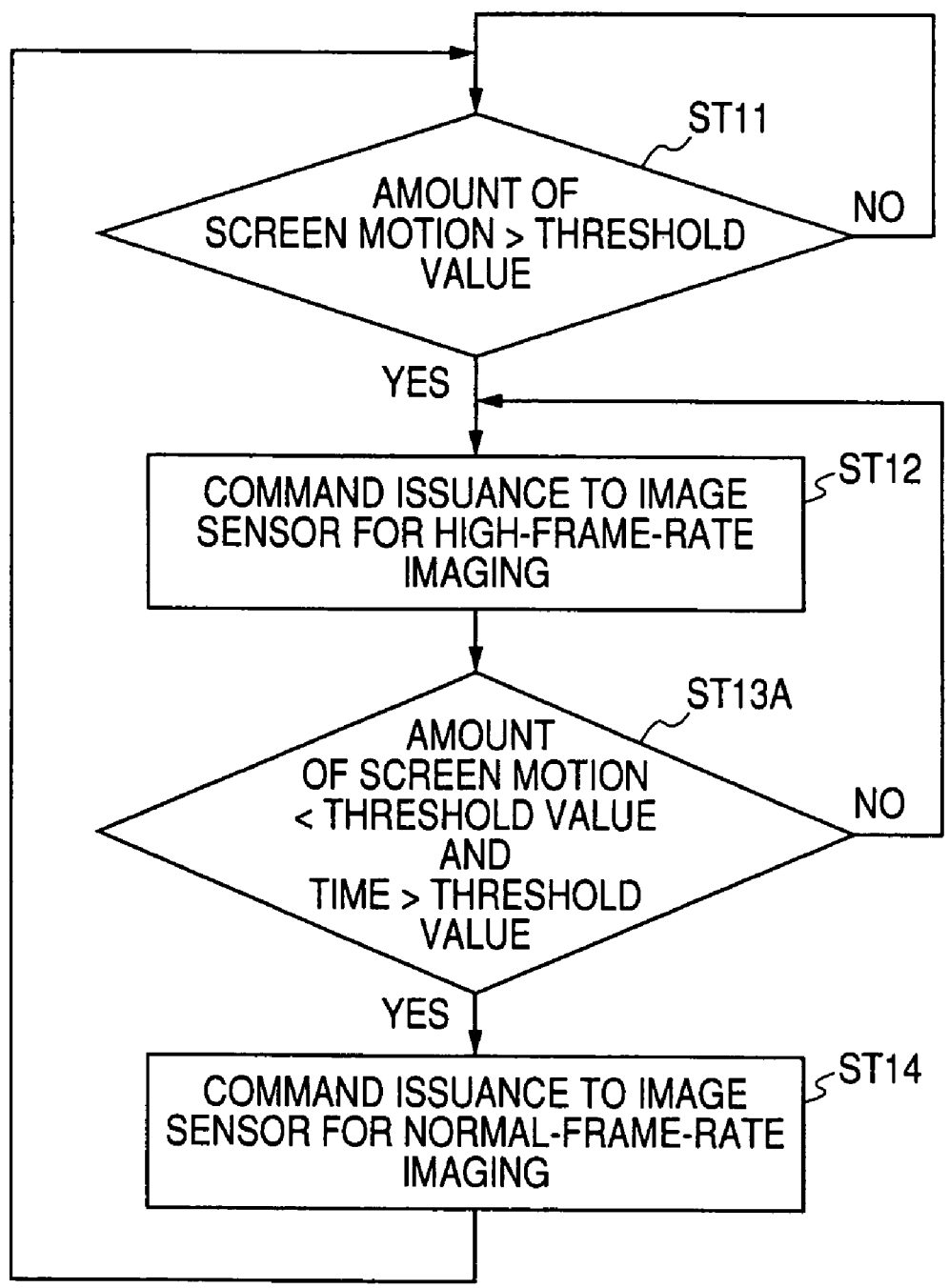
FIG. 11 is a flowchart for illustrating a third example of control application in the second embodiment.

In relation to FIGS. 9 to 11, described below is an exemplary control application of the CPU 21A in accordance with the comparison result derived between the amount of motion and the motion threshold value MTH.

Figure 9:
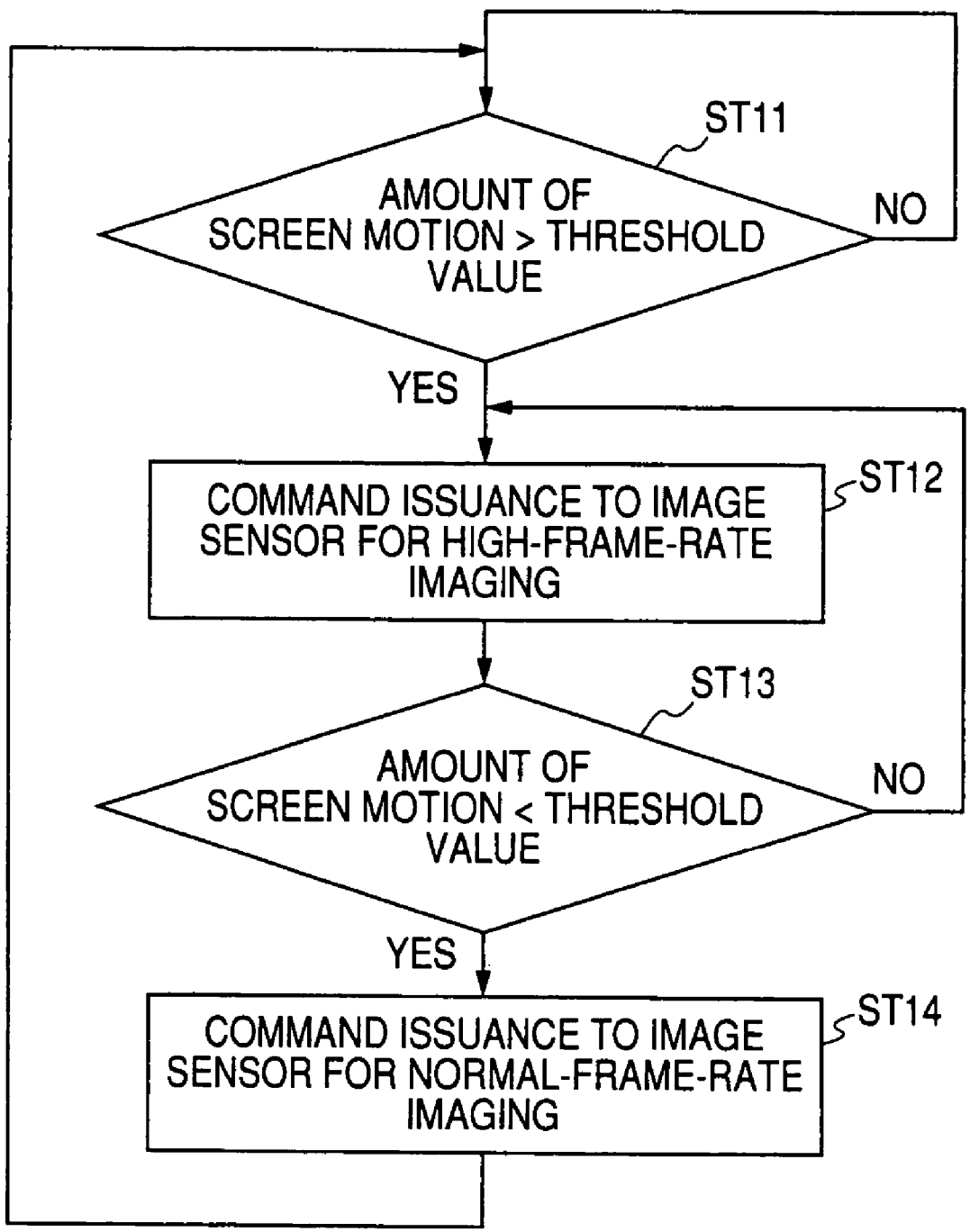
FIG. 9 is a flowchart for illustrating a first example of control application in the second embodiment.

Described first is a first example of control application in relation to the flowchart of FIG. 9.

In this example, when the amount of motion in a captured image exceeds the motion threshold value MTH (ST11), a command is issued to the image sensor 12A via the CPU 21A to increase a frame rate (ST12) so that the frame rate for imaging and recording is automatically increased.

Next, when the amount of motion in the captured image becomes lower than the motion threshold value MTH (ST13), a command is issued to the image sensor 12A via the CPU 21A to put the frame rate back to the normal value so that the frame rate for imaging and recording is accordingly put back to the normal value (ST14).

Described next is a second example of control application in relation to the flowchart of FIG. 10.

In this example, an image sensor in the normal operation performs imaging with a high frame rate (ST21), and the resulting images are recorded on the image memory 18 for a fixed length of time (ST22). Alternatively, when the amount of motion in any captured image exceeds the motion threshold value MTH (ST23), a command is issued only to a recording device (image compression section 17) for high-frame-rate recording (ST24). In such a manner, any fast-fast portion can be recoded from the beginning.

Next, when the amount of motion in the captured image becomes lower than the motion threshold value MTH (ST25), a command is issued to the recording device for normal-frame-rate recording.

With this being the case, as in step ST22, there needs high-frame-rate images in the image memory 18.

Described next is a third example of control application in relation to the flowchart of FIG. 11.

In this example, in relation to FIG. 9, in the process of step ST13, a motion threshold value for use as a reference of the high frame rate is added with a time threshold value, thereby implementing successive high-frame-rate imaging irrespective of the motion of an object, e.g., continuously moving fast or slow.

According to the second embodiment, increasing a frame rate for a fast-moving object favorably enables imaging and recording which leads to moving images showing a smooth movement.

Further, increasing the frame rate for a fast-moving object enables the capturing and recording of still images at decisive moments.

Still further, automatically increasing the frame rate is advantageous in consideration of time lag, wrong timing for imaging, or other factors while still images are manually captured in rapid succession.

Still further, during imaging from a fixed point, automatic imaging and recording are enabled through a determination of an amount of motion, thereby eliminating the need for a user to be near the device for its control.

It should be understood by those skilled in the art that various modifications, combinations, sub-combinations and alterations may occur depending on design requirements and other factors insofar as they are within the scope of the appended claims or the equivalents thereof.

What is claimed is:

1. An image signal processing device, comprising:
a recording section;
a first processing section that calculates an amount of screen motion after detection of a motion of a captured image, and determines a frame rate through comparison between a sum amount of screen motion and a preset motion threshold value; and
a second processing section that performs recording of the captured image to the recording section using a dynamically-variable frame rate which is based upon the frame rate determined by the first processing section.

2. The image signal processing device according to claim 1, wherein
the first processing section determines the frame rate based on an amount of temporal sum derived for the amount of screen motion.

3. The image signal processing device according to claim 2, wherein
the first processing section sets a high value to the frame rate when the amount of screen motion is equal to or higher than the motion threshold value, and
the second processing section performs recording of a corresponding frame to be recorded.

4. The image signal processing device according to claim 2, wherein
the first processing section sets a low value to the frame rate when the amount of screen motion is smaller than the motion threshold value, and
the second processing section performs recording by decimating a corresponding frame to be recorded.

5. The image signal processing device according to claim 2, wherein
the first processing section sets a high value to the frame rate when the amount of screen motion is equal to or higher than the motion threshold value, and the second processing section performs recording of a corresponding frame to be recorded, and
the first processing section sets a low value to the frame rate when the amount of screen motion is smaller than the motion threshold value, and the second processing section performs recording by decimating a corresponding frame to be recorded.

6. The image signal processing device according to claim 2, wherein
the second processing section is configured to record a fast-moving scene with a high time accuracy and configured to record a slow-moving screen with a low time accuracy.

7. The image signal processing device according to claim 2, wherein
the second processing section is configured to record the captured image such that for every similar fixed amount of screen motion, any similar scene is skipped at the time of recording.

8. The image signal processing device according to claim 2, wherein
when the frame rate is high, a motion vector and an amount of screen motion between the successive frames is calculated.

9. The image signal processing device according to claim 1, wherein
the first processing section determines the frame rate for a current screen by referring to the frame rate for a preceding screen.

10. The image signal processing device according to claim 1, wherein
the motion threshold value is freely changed for setting.

11. The imaging device according to claim 10, wherein
changing the motion threshold value allows for configuration of a sensitivity of a object against a motion speed of the captured image.

12. The imaging device according to claim 10, wherein
changing the motion threshold value allows for controlling an amount of recorded data during a recording of a succession of images.

13. An imaging device, comprising:
an imaging section that captures an object image, and outputs image data; and
an image signal processing device that applies a predetermined process to the image data, wherein
the image signal processing device includes:
a recording section;
a first processing section that calculates an amount of screen motion after detection of a motion of a captured image, and determines a frame rate through comparison between a sum amount of screen motion and a preset motion threshold value; and
a second processing section that performs recording of the captured image to the recording section using a dynamically-variable frame rate which is based upon the frame rate determined by the first processing section.

14. The imaging device according to claim 13, wherein
the first processing section determines the frame rate based on an amount of temporal sum derived for the amount of screen motion.

15. The imaging device according to claim 14, wherein
the first processing section sets a high value to the frame rate when the amount of screen motion is equal to or higher than the motion threshold value, and the second processing section performs recording of a corresponding frame to be recorded, and
the first processing section sets a low value to the frame rate when the amount of screen motion is smaller than the motion threshold value, and the second processing section performs recording by decimating a corresponding frame to be recorded.

16. The image signal processing device according to claim 14, wherein
the second processing section is configured to record a fast-moving scene with a high time accuracy and configured to record a slow-moving screen with a low time accuracy.

17. The image signal processing device according to claim 14, wherein
the second processing section is configured to record the captured image such that for every similar fixed amount of screen motion, any similar scene is skipped at the time of recording.

18. The image signal processing device according to claim 14, wherein
when the frame rate is high, a motion vector and an amount of screen motion between the successive frames is calculated.

19. The imaging device according to claim 13, wherein
the first processing section determines the frame rate for a current screen by referring to the frame rate for a preceding screen.

20. The imaging device according to claim 13, wherein
the motion threshold value is freely changed for setting.

21. The imaging device according to claim 20, wherein
changing the motion threshold value allows for configuration of a sensitivity of a object against a motion speed of the captured image.

22. The imaging device according to claim 20, wherein
changing the motion threshold value allows for controlling an amount of recorded data during a recording of a succession of images.

23. An image signal processing method, comprising the steps of:
detecting a motion of a captured image;
calculating an amount of screen motion;
determining a frame rate through comparison between a sum amount of screen motion and a preset motion threshold value; and
performing recording of the captured image to the recording section using the dynamically-variable frame rate determined in the determining step.

* * * * *